(12) United States Patent  
Schwartz

(10) Patent No.: US 9,902,019 B2  
(45) Date of Patent: Feb. 27, 2018

(54) MINIMAL CONTACT MODULAR LASER CUTTING TABLE SYSTEM

(71) Applicant: HOOSIER LASER, INC., Huntingburg, IN (US)

(72) Inventor: David L. Schwartz, Huntingburg, IN (US)

(73) Assignee: Hoosier Laser, Inc., Huntingburg, IN (US)

( * ) Notice: Subject to any disclaimer, the term of this patent is extended or adjusted under 35 U.S.C. 154(b) by 490 days.

(21) Appl. No.: 14/479,682

(22) Filed: Sep. 8, 2014

(65) Prior Publication Data

US 2015/0174705 A1    Jun. 25, 2015

Related U.S. Application Data

(60) Provisional application No. 61/876,251, filed on Sep. 11, 2013.

(51) Int. Cl.
```
B23K 37/04      (2006.01)
B23K 26/08      (2014.01)
B23K 26/70      (2014.01)
B23K 26/30      (2014.01)
```

(52) U.S. Cl.
CPC ........ B23K 26/422 (2013.01); B23K 26/0876 (2013.01); B23K 26/702 (2015.10); B23K 37/0408 (2013.01); B23K 37/0461 (2013.01)

(58) Field of Classification Search
CPC .............. B23K 26/422; B23K 26/0869; B23K 26/0876; B23K 37/04; B23K 37/0408; B23K 37/0461; B23K 26/704; F21Y 2115/30

USPC .............. 219/121.58, 121.63, 121.67, 121.7; 362/259

See application file for complete search history.

(56) References Cited

U.S. PATENT DOCUMENTS

| | | | | |
|---|---|---|---|---|
| 4,039,799 | A | * | 8/1977 | Stumpf ................ B23K 26/702 219/121.67 |
| 4,948,108 | A | * | 8/1990 | Sullivan .................. B25B 11/00 269/304 |
| 6,095,025 | A | * | 8/2000 | Mirabello ................ B26D 7/20 269/289 R |

(Continued)

FOREIGN PATENT DOCUMENTS

NL     WO 2012002801 A1 *  1/2012  ......... B23K 26/0876

*Primary Examiner* — Arthur O Hall  
*Assistant Examiner* — Christopher R Dandridge  
(74) *Attorney, Agent, or Firm* — Taft Stettinius & Hollister LLP; Daniel J. Krieger

(57) ABSTRACT

A laser workpiece cutting system for performing a laser cutting operation on a workpiece. The laser workpiece cutting system includes a modular support unit configured to be easily assembled and disassembled. The modular support unit includes a plurality of individual components, which when assembled, are configured to support one or more workpieces for laser cutting. A frame includes siderails configured to support a plurality of support rails, each of which includes a plurality of pins configured to support and align one or more workpiece fixtures. The workpiece fixtures, in different embodiments, are adapted to support a wide variety of different types of workpieces including, glassware, writing instruments, leather products, novelty items, toys, and utensils.

9 Claims, 16 Drawing Sheets

(56) References Cited

U.S. PATENT DOCUMENTS

| | | | | |
|---|---|---|---|---|
| 6,376,798 B1 * | 4/2002 | Remue | ................ | B23K 26/046 |
| | | | | 219/121.67 |
| 6,588,738 B1 * | 7/2003 | Sukuvaara | ............ | B23K 26/06 |
| | | | | 269/293 |
| 8,172,211 B2 * | 5/2012 | Kilian | .................... | B23K 26/38 |
| | | | | 219/121.82 |

* cited by examiner

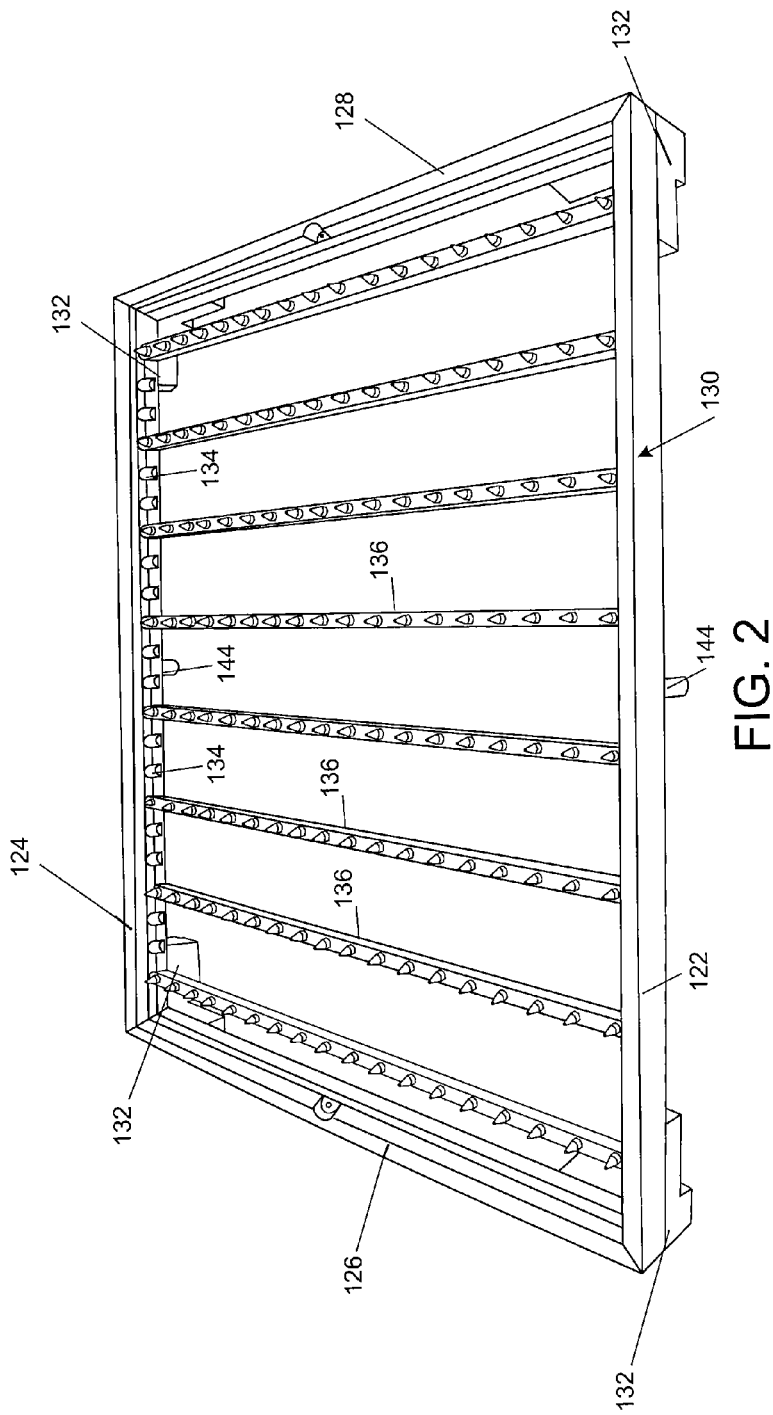
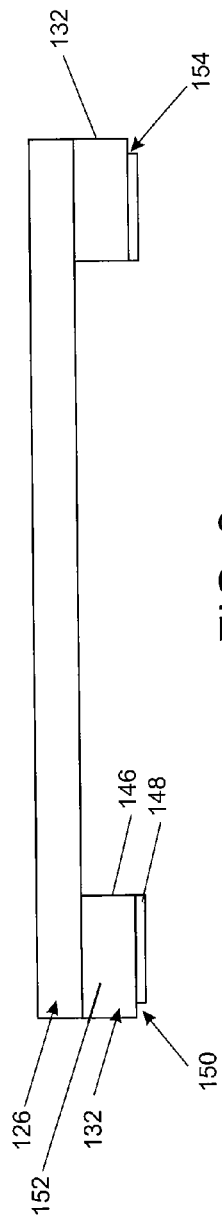
FIG. 2
FIG. 3

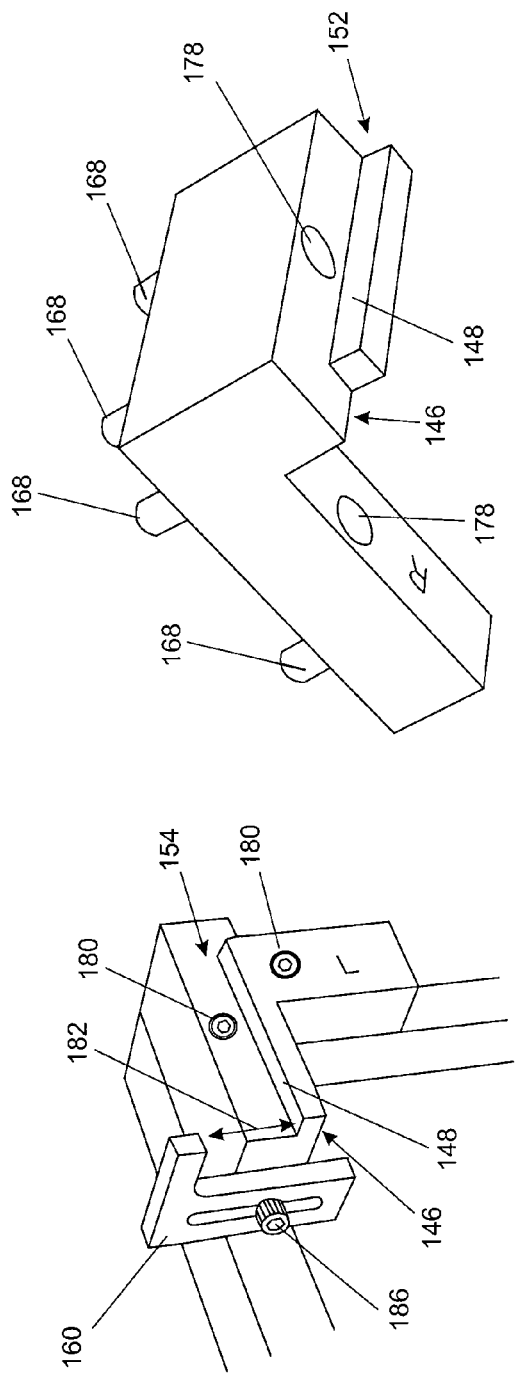
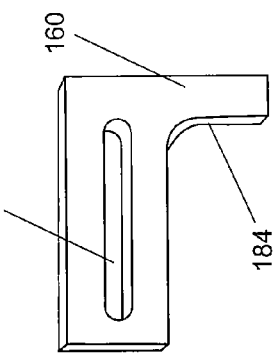
FIG. 6
FIG. 8
FIG. 7

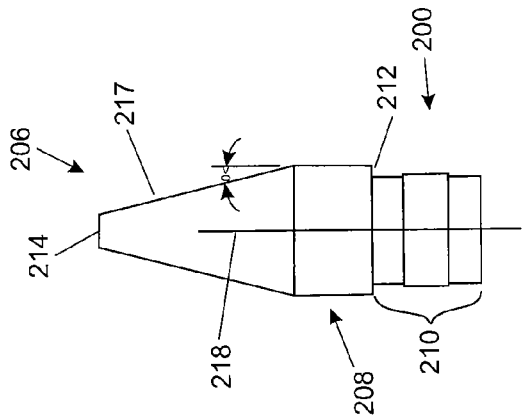
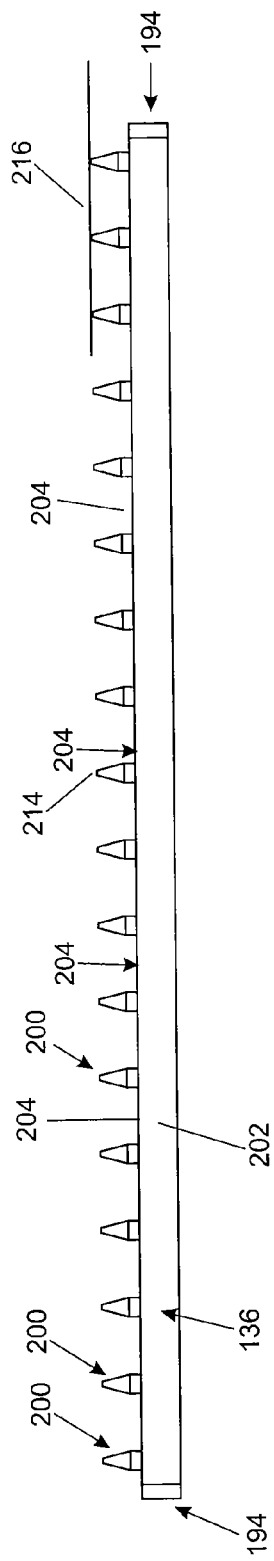

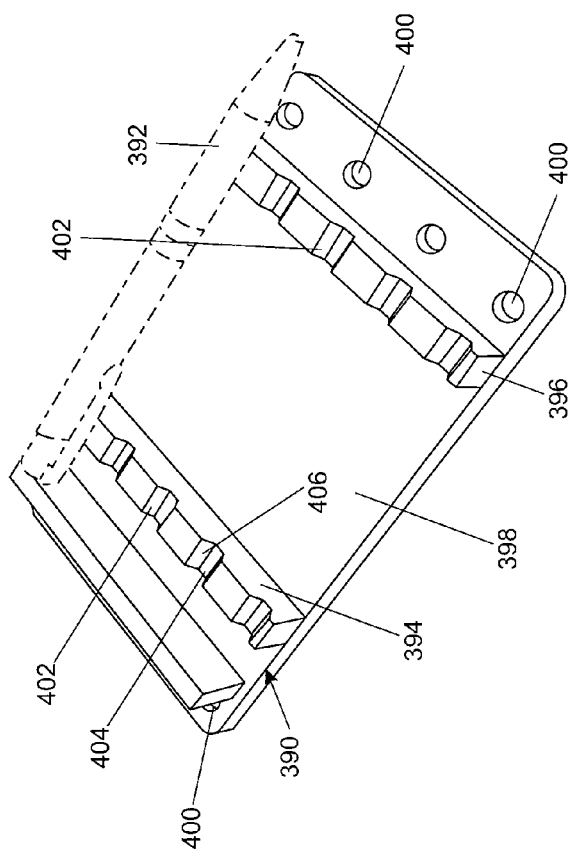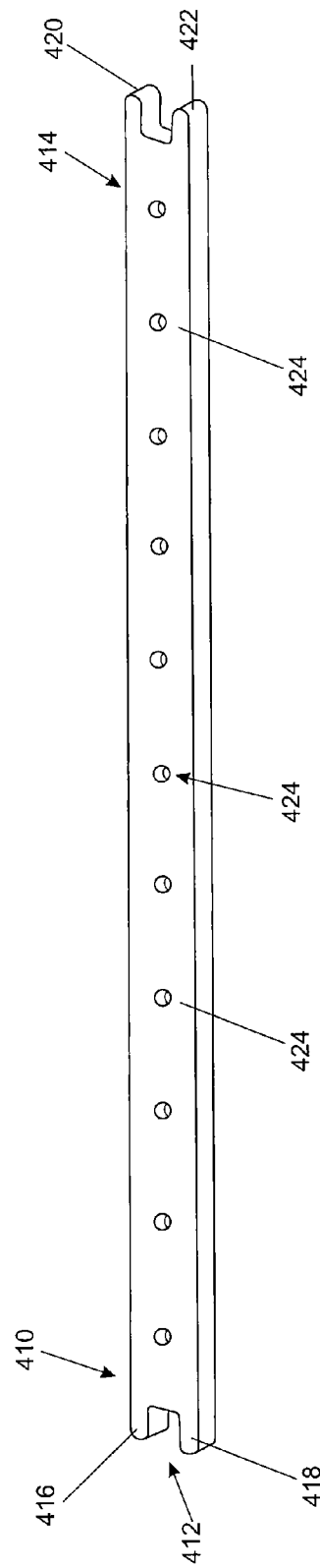

MINIMAL CONTACT MODULAR LASER CUTTING TABLE SYSTEM

RELATED APPLICATION

This application claims priority to U.S. Provisional Patent Application Ser. No. 61/876,251 entitled "Minimal Contact Modular Laser Cutting Table System", filed Sep. 11, 2013, the disclosure of which is herein incorporated by reference in its entirety.

FIELD

The present invention relates to a laser cutting table, and in particular, to a low or minimal contact modular laser cutting table system.

BACKGROUND

Laser cutting machines that use a laser beam to cut material are well known in the art. These machines often require a rotary attachment in order to apply a cut to round or curved work pieces. In some instances, the rotary attachment fails or does not rotate at a consistent speed, thereby providing a damaged workpiece which must be scrapped.

Many laser cutting machines can include a honeycomb-style grid for holding a piece of material or the work piece. The honeycomb design can be problematic in that the laser beam can hit the honeycomb features. Consequently, the honeycomb grid, which is a standard in the laser cutting industry, can cause flashbacks and burn marks on materials. The honeycomb grid must therefore be replaced as often as every couple of years, depending on use. In addition, the honeycomb grid can deflect the laser beam towards an undesirable location, such as a bottom, of the work piece. The deflected laser beam, in turn, can burn or damage the work piece. In some instances, elongated rails that run along the edges of the laser workpiece structure must also be replaced, due to damage resulting from the deflected laser beams.

A need therefore exists for a system that reduces or eliminates flashback to the work piece and to the workpiece support structure during a laser cutting operation. A further need exists for a system that is easy to assemble and clean.

SUMMARY

A laser workpiece cutting system includes a workpiece fixture support structure configured to support one or more workpiece fixtures, each of which is configured to support one or more workpieces. The laser workpiece cutting system is modular in design and can be installed in and uninstalled from a laser cutting machine in a matter of minutes. The fixture support structure includes a frame having base corner brackets, at least one of which configured to interface with one or more horizontal and vertical edge guides which are located on a laser table of the laser cutting machine. The fixture support structure can be moved toward or slid on the laser table toward the vertical edge guides and to interface with the edge guides which automatically squares the fixture support structure to the laser table. In one embodiment, the fixture support structure is fixed in in place with the laser table with one or more adjustable bracket to substantially eliminate problems which can result from the fixture support structure moving with respect to the laser table during laser cutting of a workpiece.

The fixture support structure includes a rail system having a plurality of rails each of which includes uniformly space cone-shaped pins. The rails are adjustably positionable on a frame of the fixture support structure to provide repeatable and uniform positioning of the workpiece fixtures. The spacing of the cone-shaped pins and rails provides positionable flexibility of the fixtures on the rails. The fixtures include vertical support blocs, risers, and/or specialized fixtures, which can be oriented both vertically or horizontally to maximize engraving and cutting by the laser.

In one embodiment, there is provided a laser workpiece cutting system configured to be supported by a bed of a laser machine having a laser. The laser workpiece cutting system includes a plurality of rails, each of the plurality of rails including a rail piece and a plurality of first alignment structures spaced from one another on the rail piece. A base includes a first side and a second side, wherein each of the first side and the second side defines a plurality of locating structures configured to locate the plurality of rails. A workpiece support includes a plurality of second alignment structures, wherein the plurality of second alignment structures is configured to locate the workpiece support at the plurality of first alignment structures.

In another embodiment, there is provided a laser workpiece cutting system configured to hold a workpiece to be cut by a laser supported by a laser table system having a laser. The laser workpiece cutting system includes a plurality of rails, each of the plurality of rails including a rail portion and a plurality of equally spaced cones extending from the rail portion wherein each of the rails includes a first end and second end and configured to provide an abutting surface. A base includes a first side, a second side, a third side, and a fourth side wherein each of the first side and the second side defines a plurality of locating structures each being configured to receive the abutting surface of one of the plurality of rails, and each of the first side, second side, third side, and fourth side include first and second terminating ends, each of the first and second terminating ends including a mating structure and each of the first and second terminating ends being inclined with respect to a longitudinal axis of the respective side. A plurality of base supports each includes a first support arm and a second support arm each having a connector structure. Each of the first support arm and the second support arm are aligned with one another to form a coextensive surface, wherein engagement of the mating structure to the connector structure aligns one of the first and second terminating ends of one of the sides with one of the first and second terminating ends of another of the sides, such that the aligned ends form an interface therebetween at the coextensive surface.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein:

FIG. 2 illustrates a perspective view of a support frame of the laser workpiece cutting system.

FIG. 3 illustrates a side view of one of a plurality of side rails of the support frame.

FIG. 6 illustrates a bottom perspective view of a corner bracket.

FIG. 7 illustrates a bottom perspective view of a corner bracket at the end of two of the side rails.

FIG. 8 illustrates a locator including an L-shaped configuration to be located the support frame on the bed of the laser cutting machine.

FIG. 11 illustrates a plan view of a pin rail.

FIG. 12 illustrates a workpiece supported by the tips of pins located at a pin rail.

FIG. 13 illustrates a front view of a pin.

FIG. 24 illustrates pen engraving workpiece support.

FIG. 25 illustrates another embodiment of a support rail.

DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Figure 1:
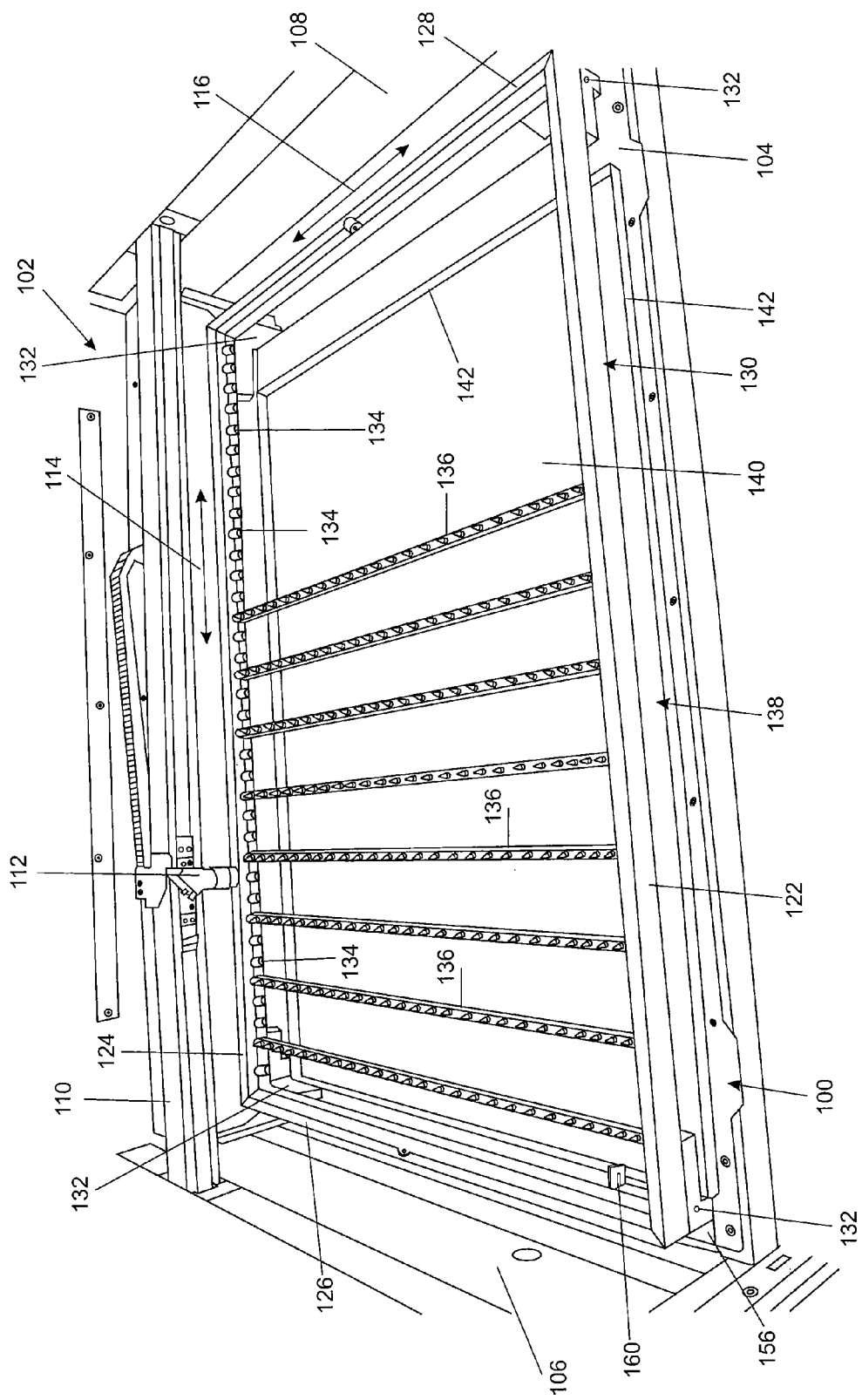
FIG. 1 illustrates a perspective view of a laser workpiece cutting system supported by a laser cutting machine.

Referring to FIG. 1, one embodiment of a laser workpiece cutting system 100 is shown. The system 100 includes a modular design and is configured to be supported by a laser cutting machine 102 including a table bed 104. The system 100 is located on the bed 104 between a first side wall 106 and a second side wall 108 of the machine 102, each of which supports one end of a movable support rail 110. The movable support rail 110 provides support for a laser 112, which is configured to move along a length dimension 114 of the system 100. The movable support rail 110 is further configured to move along a width dimension 116 of the system 100 such that the laser 112 moves in a two-dimensional pattern above the system 100 to cut or to engrave one or more workpieces (not shown) supported beneath the laser by the system 100. The use of "cut", "cutting", "engrave" or "engraving" are used interchangeably throughout this disclosure, since the system 100 is used to cut or to engrave workpieces including sheets of material of finished devices or products.

The system 100 includes a first side rail 122, a second side rail 124, a third side rail 126, and a fourth side rail 128 that are coupled to one another to form a four-sided support frame 130. Each of the rails 122, 124, 126 and 128 interfaces with an adjacent rail at a corner of the support frame 130, where each of the corners is supported by one of a plurality of support brackets 132. While the illustrated system 100, includes four side rails to form the outer frame, in different embodiments, any number side rails are used to form the outer frame.

Any one or more of the adjoining or adjacent side rails can include rulers or measurement devices for use during a laser cutting operation. Although not shown, in one embodiment, the side rail 122 and side rail 126 include measurement markings to thereby form a measurement system.

Each of the side rails 122 and 124 includes of plurality of locating structures 134, each formed as groove or aperture, which are configured to receive an end of a pin rail 136. Each end of the pin rail 136 is configured to engage the locating structure 134 of one of the side rails 122 and 124. In different embodiments, the locating structures 134 include grooves, slots, or apertures and the ends of the pin rail include a corresponding structure to hold the pin rail 136 in a stable position at the corresponding side rail. The locating structures 134, in one embodiment as illustrated, are uniformly spaced along the length 114 of the side rails 122 and 124. A tray 138 includes a catch portion 140 located between side walls 142 and is insertable beneath the pin rails 136. The tray 138 is removable from beneath the pin rails 136 to remove any debris which results from the laser cutting of workpieces supported by the support frame 130. The tray 138 is positionable for collecting debris or other small particles from the cutting operation. In this manner, the removable tray provides an environmentally-friendly feature to the system 100 that is not available with many conventional laser cutting tables.

As further illustrated in FIG. 2, the support frame 130, in one embodiment, includes a plurality of center supports 144 each of which is generally located at a middle of one of the side rails 122 and 124. The center supports 144 are configured to support the middle of the side rails in the event that larger or heavier workpieces are being supported by the system 100. As can be seen, however, the presence of the center support 144 prevents the tray 138 from being used in this embodiment. In another embodiment, however, a tray 138 is configured to fit between one of the corner supports 132 and the center support 144.

FIG. 3 illustrates a side view of the side rail 126, including the corresponding corner brackets 132. As seen in FIG. 3, the corner brackets 132 include a first portion 146, coupled to the side rail 126 and a second portion 148, which includes at least one side 150 which is offset from a side 152 of the first portion 126. The interface of the side 150 with the side 152 defines a recess 154. The recess 154 is configured to engage an edge guide 156 located at the table bed 104 of the laser cutting machine 102. See FIG. 1.

Figure 4:
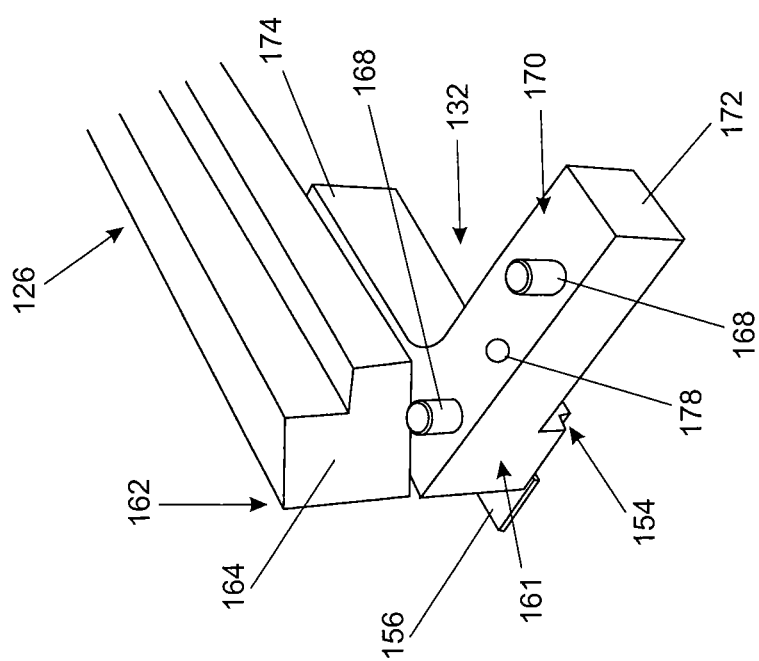
FIG. 4 illustrates a front perspective view of a corner bracket at an end of one of the side rails.

As illustrated in FIG. 4, the corner bracket 132, in one embodiment, includes two of the recesses 154, one of which is shown and the other of which engages the edge guide 156. In other embodiments, only one of the recesses 154 is included in a corner bracket. By incorporating two of the recesses 154 in a single corner bracket, the corner brackets are interchangeable at each of the corners of the support frame 130, thereby reducing assembly time. Consequently, the system 100 is slid on the table bed 104, until the recessed portion 148 engages the edge guide 156.

Figure 5:
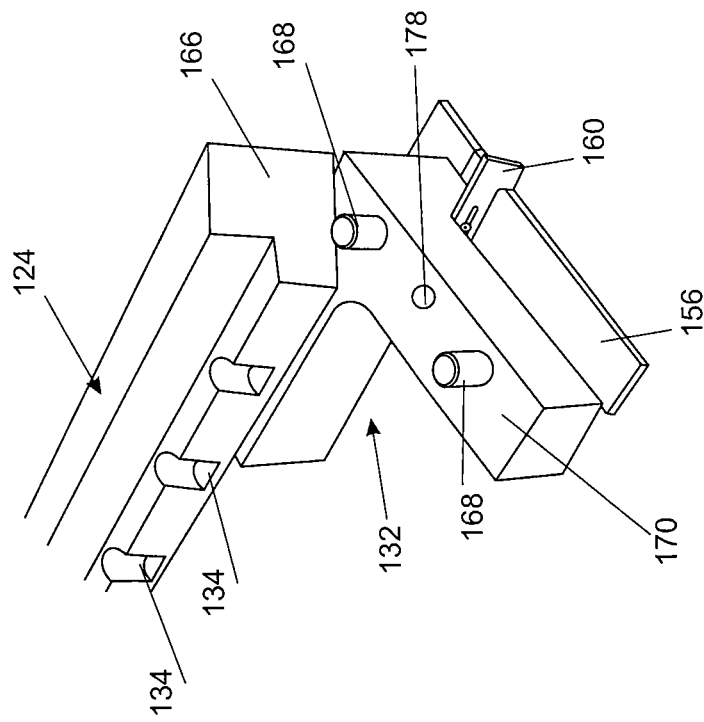
FIG. 5 illustrates a front perspective view of a corner bracket at an end of another of the side rails.

In one embodiment, as illustrated in FIG. 5, a locator 160 is slidingly coupled the corner bracket 132. Adjustment of the locator 160 with respect to the corner bracket 132 provides a gap between the recess 154 and the locator 160 such that the system 100 is located at the edge guide 156 and therefore kept in place with respect to the table bed 104, and consequently, the laser 112. In this way, the cutting or engraving of a workpiece is made repeatable such that the lasered surface of each of a plurality of workpieces supported by the rails 136 are substantially identically formed.

As illustrated in FIGS. 4 and 5, the corner bracket 132 not only supports the support frame 130 at each corner, but also includes a connector structure 161 which is configured to couple each of the side rails to an adjacent side rail at a joint located at terminating ends of the rails. As seen in FIG. 4, for instance the side rail 126 terminates at an end 162 which includes a surface 164. The surface 164 is substantially planar and is configured to interface with an end 166, for instance, of the side rail 124. Each of the connector structures 161 includes one or more pins 168 extending from the corner bracket 132 which engage corresponding openings or apertures (not shown) defined in the ends 162 of the side rails. As shown in the illustrated embodiments of FIG. 4, the pins 168 are aligned and spaced on a top surface 170 of the bracket 132 wherein the a line drawn through two of the pins on a first part or arm 172 of the bracket 132 intersects a line drawn through two of the pins (not shown) in a second part or arm 174 of the bracket 132. Since the ends of the rails are approximately formed at 45 degrees with respect to the length of the rail, a joint between two adjacent rails is formed at the corner bracket 132. By inserting the apertures of the rails into the pins 168 of a corner bracket 132, the rails are held securely to form the support frame 130.

As further shown in FIG. 6, each of the brackets 132 further includes one or more apertures 178 which are configured to receive a connector, such as a screw of bolt 180 (see FIG. 7), which extends through the apertures 178 and into corresponding apertures (not shown) located at the ends of the rails. The insertion of the connectors 180 through the corner connector 132 and into the side rails secures the corner connector 132 to two of the rails to form a substantially rigid frame 130. While apertures 178 are illustrated, other embodiments of connecting the corner connector 132 to the rails to form the frame 130 are possible, including those in which the rails are located at the corner brackets by press fit only, or a combination of press fit and other connectors, including other pins and apertures. In addition, in different embodiments, the pins 168 are replaced by apertures and the corresponding apertures are replaced by pins, in different number and in different configurations.

FIGS. 6 and 7 also illustrate the recess 154 which is formed between the first portion 146 and the second portion 148 of the corner connector 132. The edge guide 156 engages a side surface of the portion 148 and a bottom surface of the portion 146 when the support frame 130 is placed in position abutting the edge guide 156. The support frame 130 is secured in place by the locator 160 which includes an L-shaped configuration, as further illustrated in FIG. 8. The locator 160 is adjustable with respect to the frame 130 and one of the corner brackets, such that a gap 182 between an arm 184 is adjustable. The gap 182 is changed according to the size of the edge guide 156 by moving the locator 160 along a fastener 186 extending through a slot 188 of the locator 160. The fastener 186 is loosened to enable adjustment of the locator 160 and is tightened to fix the locator 160 in position once the desired gap 182 is determined. In different embodiments, the fastener includes a hand or tool-tightened bolt, screw or a cam mechanism. FIG. 6 illustrates the corner connector 132 identified with an "R", for right, to indicate the location thereof in the system 100. FIG. 7 illustrates a corner connector 132 identified with an "L" for left. The left connector 132 and the right connector 132 are located on the left and right sides to accommodate the tray 138.

Figure 9:
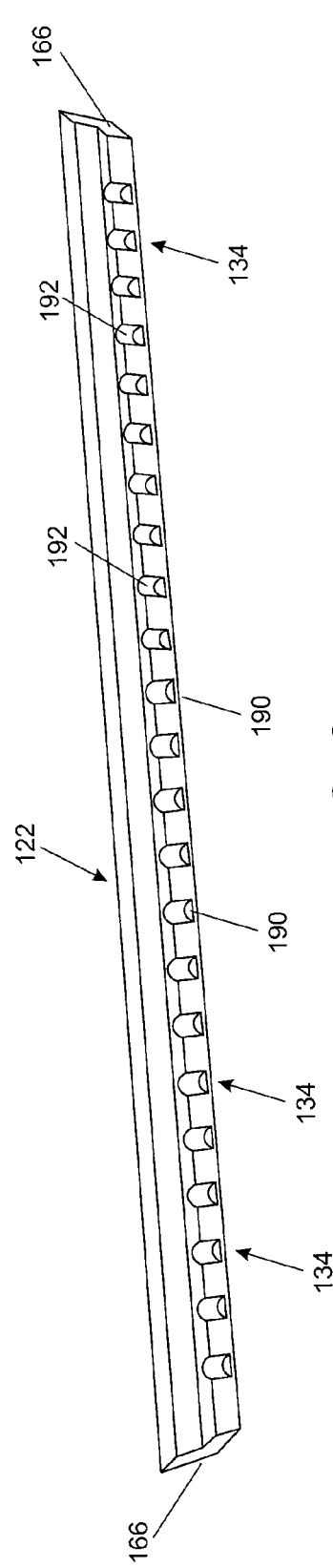
FIG. 9 illustrates a front view of one of the side rails having locating structures.

FIG. 9 illustrates one of the rails 122 and 124. In the illustrated embodiment, one of the rails 122 and 124 is shown since the other rail is substantially identically formed. Consequently, each of the rails 122 and 124 are interchangeably locatable to form the frame 130. As illustrated in this view, the rail 122 includes the plurality of locating structures 134 which is configured as an aperture defining one half a cylinder with a base surface 190 and a wall 192 extending from the base surface 190. Each of the ends 194 of the pin rails 136 are configured to engage the locating structures 134 as further illustrated in FIGS. 11 and 12.

Figure 10:
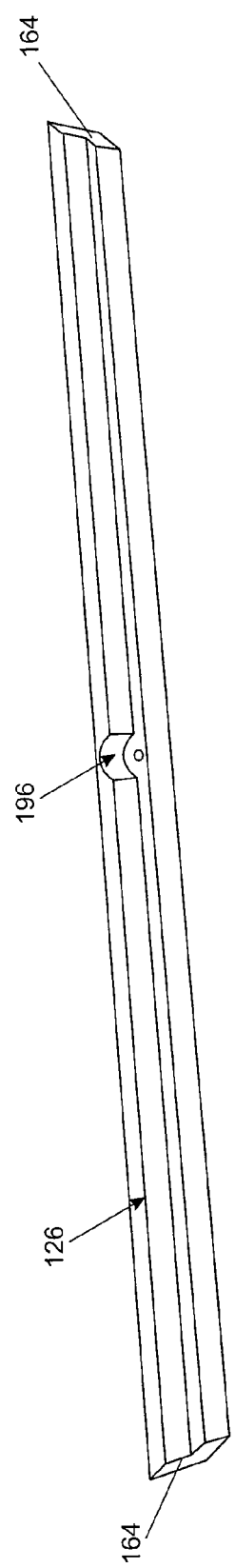
FIG. 10 illustrates a front view of another of the side rails.

FIG. 10 illustrates one of the rails 126 and 128. In the illustrated embodiment, one of the rails 126 and 128 is shown since the other rail is substantially identically formed. Consequently, each of the rails 126 and 128 are interchangeably locatable to form the frame 130. As illustrated in this view, the rail 126 includes a recess 196 configured to receive a connector or coupler such as a screw or bolt. The recess 196, in different embodiments, provides for the mounting of different types of fixtures adapted to either secure or to locate one or more workpieces.

FIG. 11 illustrates a plan view of one of the pin rails 136. The pin rail 136 includes the terminating ends 194 as described. Since the frame 130 includes opposed rails 124 and 126 and regularly spaced locating structures 134, each of the ends 194 of the rails 136, when placed in opposed locating structures, are substantially located parallel to an adjacent rail 136, as illustrated in FIGS. 1 and 11. Each of the pin rails 136 includes a plurality of alignment structures, in particular locating pins 200, each of which extends from a bar 202. The plurality of pins 200 are spaced along the length of the bar 202 and extend from a generally planar surface 204 of the bar such that the planar surface 204 extending along the length of the bar 202 defines a substantially flat plane which provides a support surface for the fixtures as described later herein.

Due to the structure of the rails 122, 124, 126, and 128, and the corners 132, the pin rails 136 are locatable along the rails 122 and 124 at equal spacing. Additionally, the pin rails 136 are configured such that pin rails are locatable at a wide variety of locations to provide maximum production output. Likewise, different configurations enable the processing of odd and irregularly shaped workpieces, both horizontally and vertically, by moving the pin rails left or right.

Each of the pins 200 is similarly formed such at the pin 200 of FIG. 13, which includes a cone-shaped portion 206 extending from a cylindrically shaped base 208. Extending from the base 208 is a support portion 210 which is configured to inserted into a plurality of holes (not shown) located in the bar 202. The support portion 210 is press fit into the bar 202 to stably hold the pins 200 in a fixed position. A surface 212 of the base 208 provides a stop for pin insertion into the bar 202 such that a terminating end 214 of each of the pins 200 defines a substantially flat plane 216 extending along the terminating ends 214. In the embodiment of FIGS. 11, 12, and 13, the terminating end 214 defines a substantially flat tip. Due to the locations of the base surface 190 of the locating structures 134 and the plane 216 defined by the tips of the pins 206, the substantially flat plane 216 not only extends along the length of the rail 202, but also from one adjacent rail 136 to a next adjacent rail as illustrated in FIG. 12. Consequently, as seen in FIG. 12, a workpiece 220 is supported by the tips of the pins 206 in a generally horizontal planar fashion. Consequently, laser cutting of the workpiece by the laser 112 is consistent and repeatable on the surface of the workpiece 220 from one workpiece 220 to the next. While insertable pins are described, in other embodiments, the pins 206 and the bar 202 are formed as a single piece of material.

In one example, the distance between adjacent slots locating structures 134 is approximately 1", whereas in other examples the distance can be between 0.5" and 10 inches. To assemble the pin rails 136 to the side rails, the ends of pin rails 136 are disposed in the locating structures 134 of the second side rail 122 and the side rail 124. In this example, the pin rails 134 are not lockingly engaged to the side rails and, therefore, can be quickly removed therefrom during disassembly.

Each of the pins 200, in one embodiment, is formed as a low-contact, cone-shaped structure capable of holding or supporting a work piece. The plurality of pins 200, in one embodiment, is equidistantly spaced from one another by a predetermined distance, where the distance between pins includes any desired distance. In one example, the plurality of pins 200 is spaced from one another by at least 1". In another example, the plurality of pins 200 is spaced from one another by at least 2". In a further example, the plurality of pins 200 is spaced by less than 1" but at least 0.5". The spacing of the plurality of pins, in different embodiments, is determined to accommodate a broad range of workpieces or fixtures for any intended purpose. The present disclosure, therefore, does not restrict the distance between adjacent pins 200.

The cone-shaped pins 200 include a tapered angle α defined by the surface 217 with respect to the axis 218. In one embodiment, the angle α is approximately 15 degrees. With the pins 200 being equidistantly spaced from one another, the system 100 is configured to achieve minimal contact between the pins 200 and the work piece. Moreover, the shape of each pin 200 is configured to diffuse the laser beam during a laser cutting operation and substantially reduce flashback and surface defects on the work piece from the laser beam. The tapered cone shaped pins 200 provide a low-contact surface to minimize contact of the laser beamed with the material or workpiece being processed. The unique tapered design of the cone shaped pin diffuses and spreads the laser beam, which virtually eliminates the flashbacks and burn marks on materials and workpieces from the laser beam which eliminates waste. While the pin 206 includes a tip 214 being substantially flat and perpendicularly located with respect to the axis 218, in other embodiments the tip 214 is rounded.

The cone shaped pins 200 and pin rails 136 are milled to high tolerances from a high grade of material to maintain consistency across the work surface which is very critical to operating the laser at maximum cutting efficiency. In one embodiment, the material is aluminum.

Figure 14:
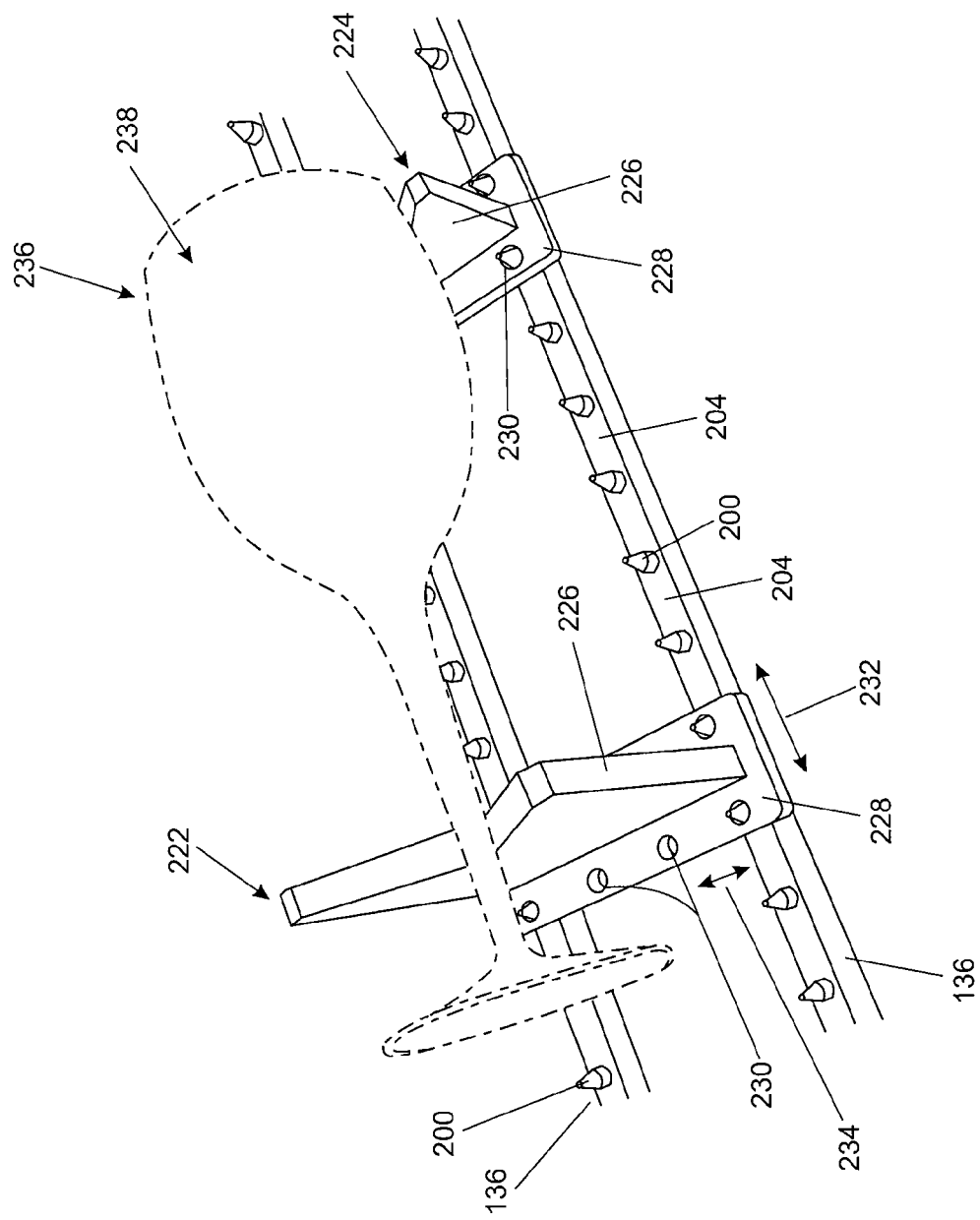
FIG. 14 illustrates a perspective first V-block riser and a second V-block riser located on pin rails and supporting a goblet glass.

As further illustrated in FIG. 14, a first V-block riser 222 and a second V-block riser 224 are located on and span two of the rails 136. Each of the V-block risers 222 and 224 includes a first portion 226, defining a "V" shaped surface, and a base portion 228 coupled to the first portion 226. The base portion 228 includes a plurality of apertures 230 each of which is configured to accept one of the pins 200. The apertures 230 are regularly spaced and the distance between the apertures 230 is configured to align with the spacing of the pins 220 along the length of the pin rail 136 in one direction 232 and to align with the spacing of the pin rails 136 in another direction 234. Consequently, the pin rails 136 are locatable along the rails 122 and 124, such that the pins engage the apertures 230 in the two directions 232 and 234.

The apertures 230 are slightly larger than the base 208 of the pins 206 in the illustrated embodiment of FIG. 13. Consequently, the pins 206, in this embodiment, do not support the base 228, but instead provide for the alignment of the risers with respect to the pin rails 136. The base 228 is therefore supported by the planar surface 204 located between pins 200. The risers 222 and 224 are therefore located substantially horizontally on the pin rails 136 no matter where located, such that, in different embodiments, different sizes, including widths and heights of V-block risers are used to support different types of workpieces.

In the embodiment of FIG. 14, a goblet 236, typically used to hold wine, is supported by the first and second risers 222 and 224 such that a surface 238 is aligned substantially horizontally with respect to the travel dimensions of the laser 112. A lasered portion of the goblet, such as logo, is therefore consistently made from one goblet to another. To accommodate the goblet 236, the first portions 226 of risers 222 and 224 define V-shapes of different configurations. The apex of the V-shape of riser 224 is closer to the base 228 than the apex of the V-shape of riser 222. Goblets of different sizes are therefore supported in a desired position.

Figure 15:
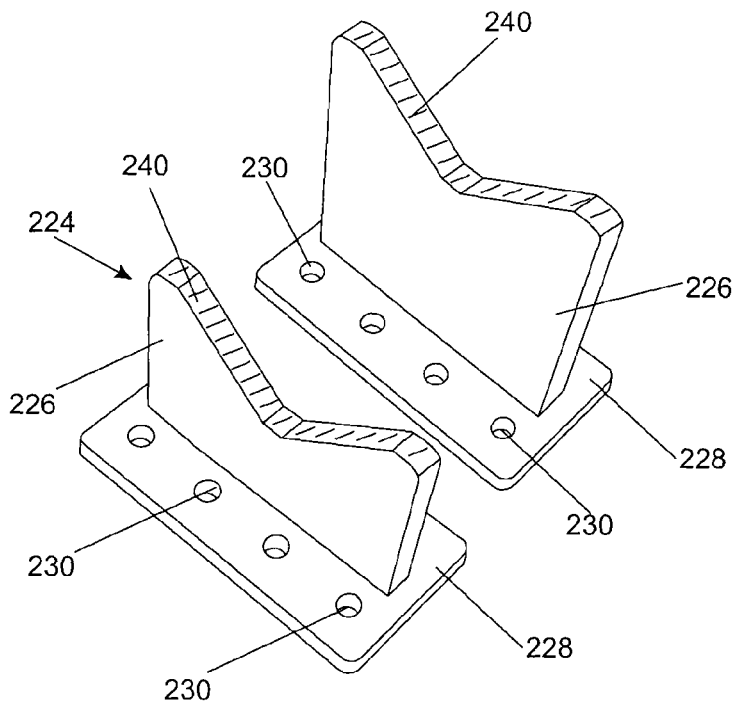
FIG. 15 illustrates a perspective first V-block risers and a second V-block riser of different sizes.

FIG. 15 illustrates the V-block risers 222 and 224 without the goblet 236. In this embodiment, each of the V-block risers 222 and 224 includes a non-slip material 240 applied to the V portions of the upright portions 226. The non-slip material 240 is applied to the V portions to reduce the likelihood of the workpieces moving during a laser operation. Depending on the material 240 being applied and the type of workpiece being processed, the workpieces are held securely during a cutting operation. In fact, the material 240, in different embodiments, is selected to be used with the type of workpiece being processed.

Ability to locate parts horizontally or vertically for maximum production efficiency and the processing of odd shaped parts without a rotary attachment is also provided the V-block risers. By incorporating a relatively uniform hole spacing along both of the horizontal directions and different sizes and types of upright portions 226 in the vertical direction, the height and location of a workpiece, including its different parts, are raised and lowered beneath the laser 112 to achieve a uniform lasered surface from one workpiece to the next.

The V-block risers include a self-centering design such that the workpiece centers itself when placed onto the V-apertures. The V-block risers and the modular rail design substantially eliminate the need for a rotary attachment to process odd shaped parts. Consequently, a reduction in setup cost results from the modular design having uniform spacing of all pins 200 and pin rails 136, such that horizontal and vertical placement of workpieces is made consistently from one workpiece to the next. Once a setup of the system is made to process a first type of workpiece, subsequent processing of additional workpieces of the same type is made by mere placement of the workpiece on the risers in the same location. Setup for additional runs is therefore reduced, in at least one instance, from a period of 30 to 45 minutes to a period of 1-3 minutes instead. In some embodiments, an increase in production speed is greater than 300% than typically experienced for laser systems using a rotary attachment.

Figure 16:
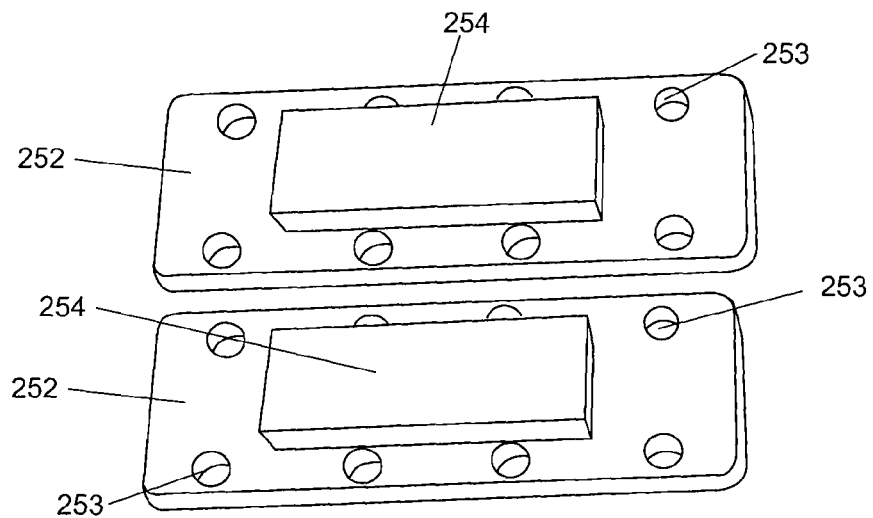
FIG. 16 illustrates a perspective view of a first and a second planar riser.

FIG. 16 illustrates another embodiment of a riser, which in this embodiment is a planar riser 250. The planar riser 250 includes a base portion 252, having apertures 253, and a riser portion 254. As described previously, the apertures 253 are configured to be located at the pins 200 of the rails 136. In this embodiment, however, the planar portion 254 includes a thickness which elevates a workpiece placed on the portion 254 above the tips of the pins 200. While two planar risers 250 are shown, one or more planer risers 250 are placed on the rails 136 to accommodate workpieces of different sizes and shapes.

Figure 17:
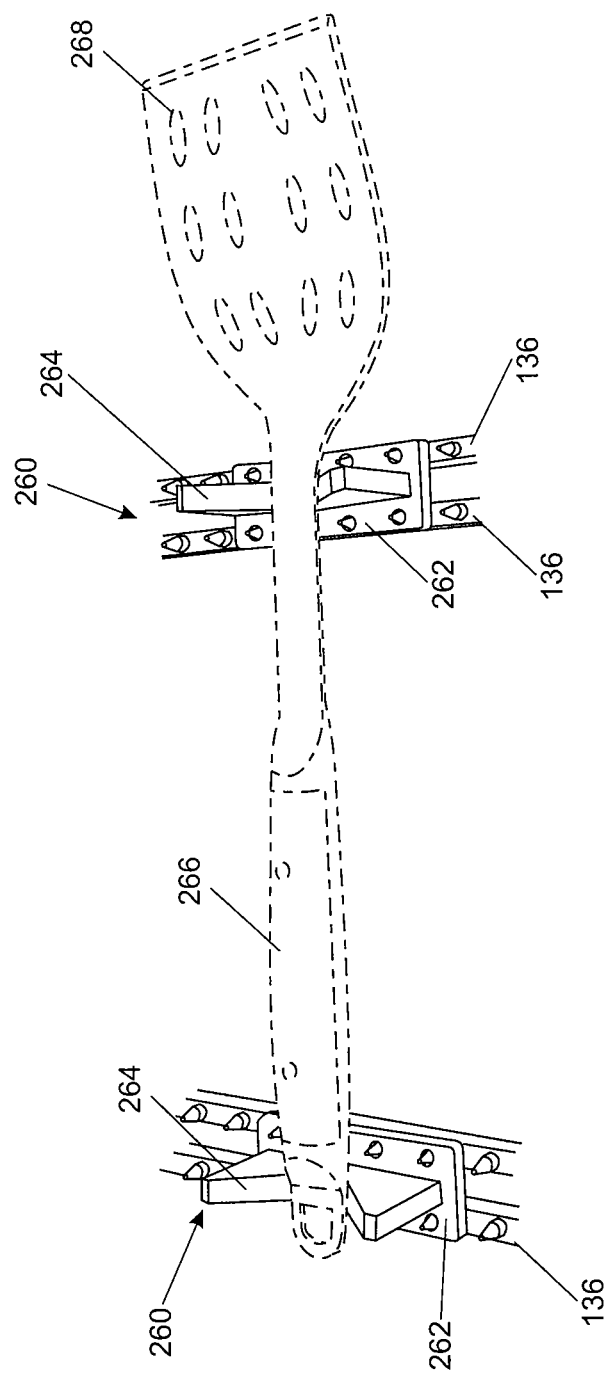
FIG. 17 illustrates another embodiment of the use of a first and a second V-block riser configured to support a spatula.

FIG. 17 illustrates another embodiment of the use of a first and second V-block riser 260, each of which include a first portion 262 having apertures and an upstanding V-portion 264 defining a V apertures. Each of the risers 260 are of the same configuration but are placed on the pin rails 136 such that the V aperture extends along the length of the pin rails 136 as opposed to being perpendicularly located as illustrated in FIG. 14. Such placement enables the laser 112 to cut or etch a logo or text along a handle 266 of a spatula 268. As can be seen therefore, the V-block risers, as described herein, are locatable in different configurations and in different locations to accommodate a wide variety of different types of workpieces.

Figure 18:
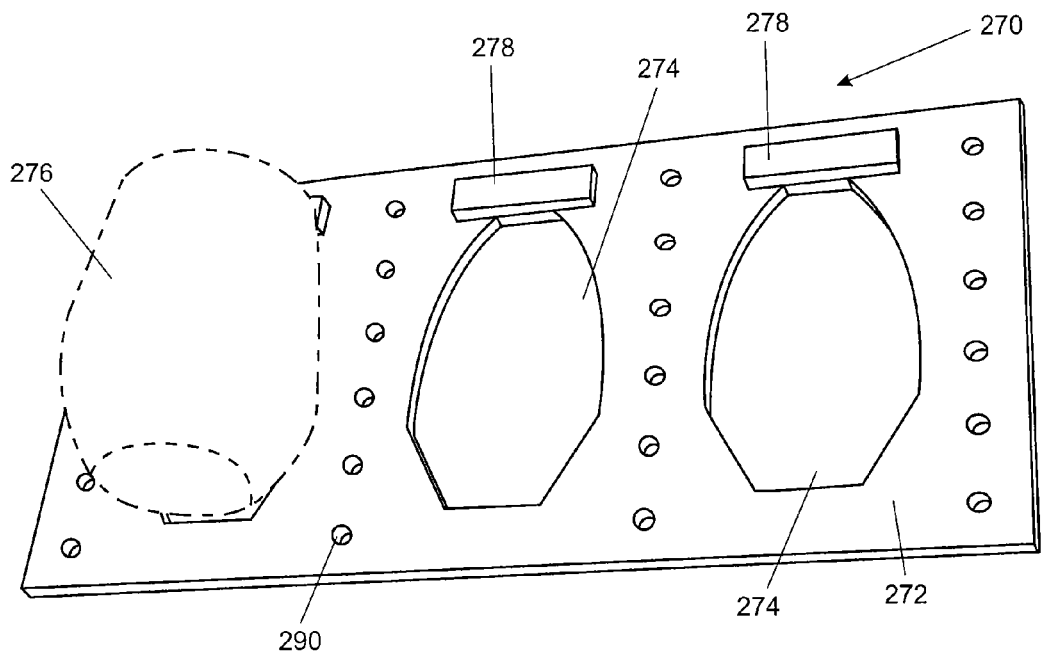
FIG. 18 illustrates one embodiment of a workpiece support having cutouts.
Figure 19:
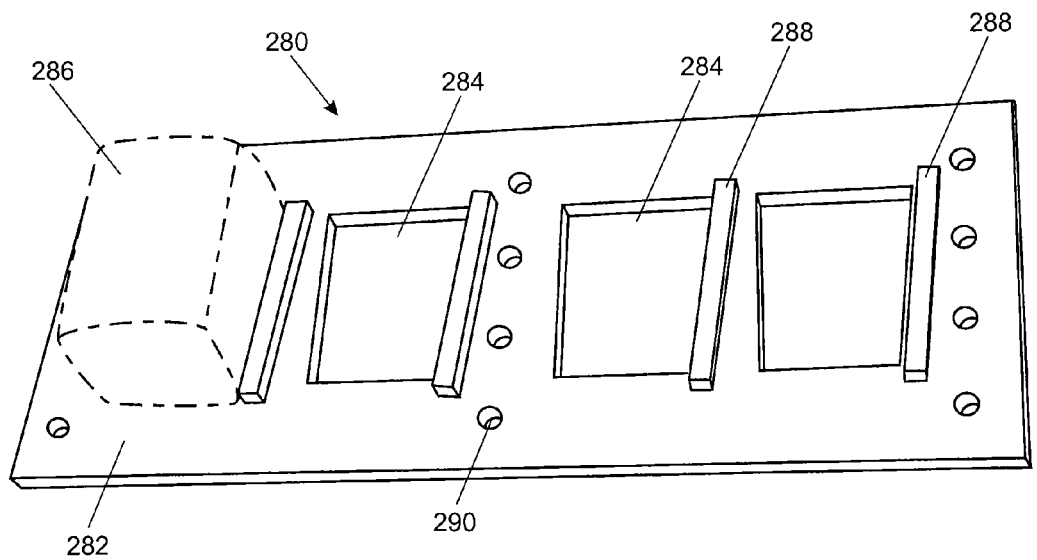
FIG. 19 illustrates another embodiment of a workpiece support having cutouts.

FIGS. 18 and 19 illustrate two different types of workpiece supports having similar features. In FIG. 18, a workpiece support 270 includes a bottom portion 272 having cutouts 274 configured to receive a portion of a workpiece, which in this example is a drinking glass 276. The cutouts 274 include an outline configured to capture an outer surface of the glass 276 such that that a major portion of the glass 276 is located above a plane defined by the bottom portion 272. The workpiece support 270 includes a stop 278 located at an edge of the cutout 274 which provides an abutting surface or locating surface for the glass 276. The stop 276 is located to abut the glass at an end of the glass 276. In FIG. 19, a workpiece support 280 includes a bottom portion 282 defining apertures 284 configured to accommodate a shot glass 286. In this embodiment, however, a stop 288 is located along a side of the shot glass 286. In each of the embodiments of FIGS. 18 and 19 a plurality of apertures 290 are aligned along the length of the corresponding workpiece. In addition, as illustrated in FIG. 18, each line of apertures 290 is located between an adjacent cutout 274 to provide support between each of the glasses. In FIG. 19, each line of apertures 290 are located not between every cutout 284. Consequently, the locations of apertures, in different embodiments, are configured to accommodate the size, shape, and the weight of the workpiece.

Figure 20:
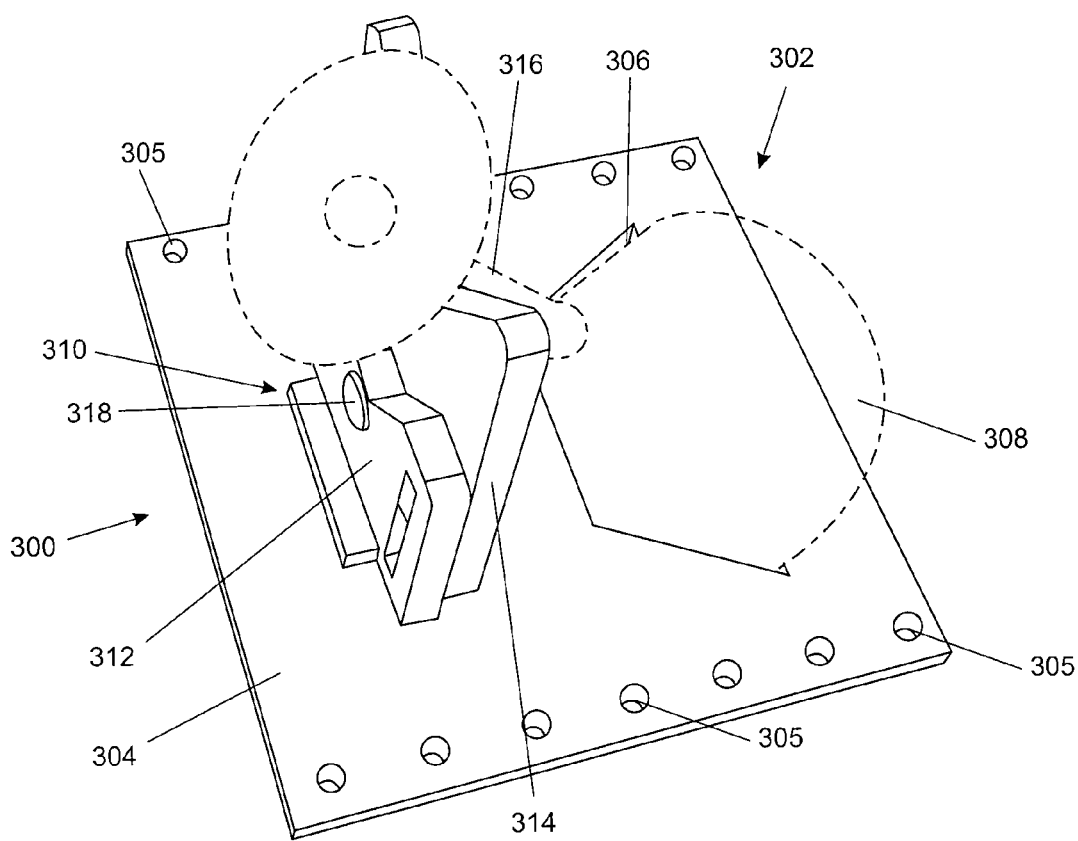
FIG. 20 illustrates a perspective view of a cocktail glass workpiece support.

FIG. 20 illustrates a cocktail glass workpiece support 300 configured to support a cocktail glass 302, such as a martini glass. The workpiece support 300 includes a base portion 304 which includes apertures 305 and defines a cutout 306 configured to receive an inverted cone bowl 308 of the cocktail glass 302. The cutout 306 includes a defined perimeter, which contacts at least a portion of the bowl 308 to support the bowl 308 above the base portion 304. An adjustable V-block riser 310, which extends from the base portion 304, includes a fixed portion 312 and an adjustable V-portion 314. The fixed portion 312 is fixed to and extends upwardly from the base portion in a substantially vertical fashion. The adjustable V-portion 314 includes a V-shaped cutout configured to support a stem or neck 316 of the glass 302. A wingbolt 318 extends through the fixed portion 312 and the V-portion 314. A slot (not shown) on the V-portion 314 enables the V-portion 314 to be vertically adjusted with respect to the base portion 304. A wingnut (not shown) is coupled to the wingbolt 318 is used to fix and hold the V-portion 314 at a selected position. By adjusting the height of the V-portion 314, the stem 316 is raised up or down and the surface of the bowl 308 is therefore located at a position to enable laser cutting or engraving. In one embodiment, adjustment of the V-portion 314 positions at least a portion of the surface of the bowl 308 to be substantially parallel to the plane of the base portion 304 to thereby present to the laser a substantially parallel bowl surface in at least in one direction. The V-portion 312 part, by sliding up or down, provides for the leveling of the glass surface and is held in place by tightening the wing bolt.

Figure 21:
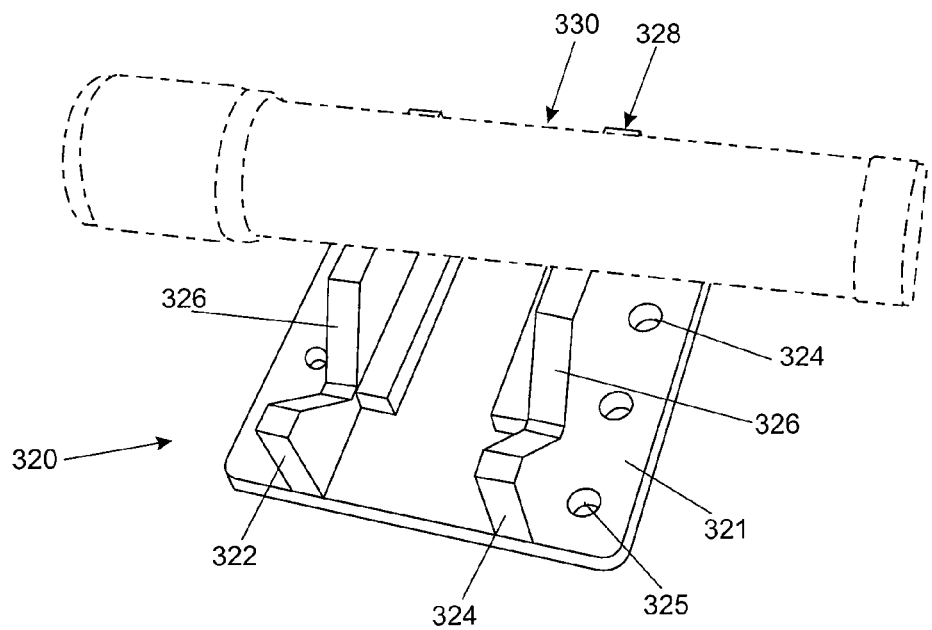
FIG. 21 illustrates a double V-riser workpiece support.

FIG. 21 illustrates another embodiment of a workpiece support. A double V-riser workpiece support 320 is illustrated and includes a base portion 321, a first v-block riser 322, and a second V-block riser 324 extending from the base portion 321, which includes apertures 325. Each of the V-block risers 322 and 324 include a first and a second V-shaped cutout 326 and 328. The V-shaped cutouts of one riser 322 are aligned with the V-shaped cutouts of the riser 324 to support a workpiece 330, which is this example is a flashlight. In this embodiment, the support 320 is well suited to support a workpiece including a cylindrical portion which includes a consistent dimension, such as a diameter, between the risers 322 and 324

Figure 22:
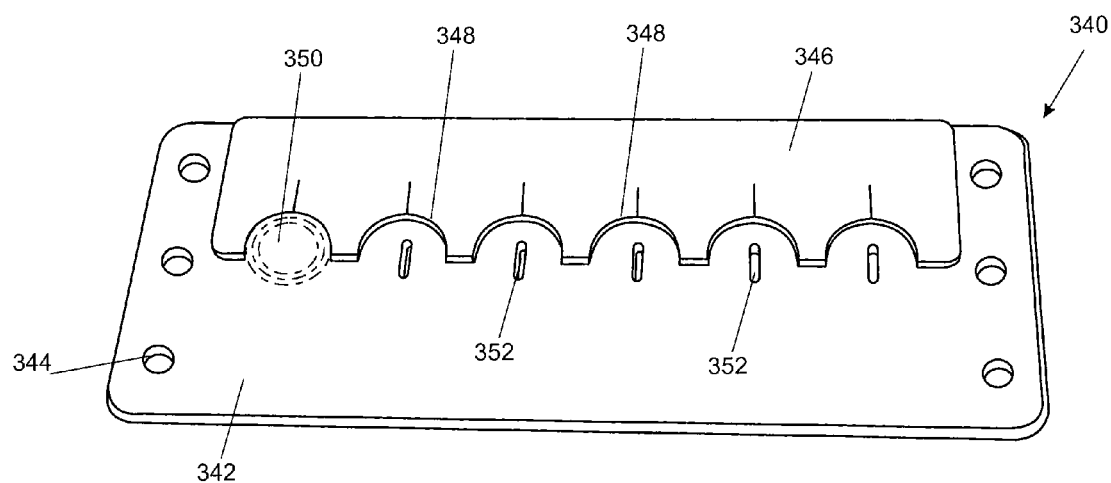
FIG. 22 illustrates a lapel pin workpiece support.

FIG. 22 illustrates a lapel pin workpiece support 340 including a base portion 342 having apertures 344. An alignment portion 346 is located at the base portion 342 and includes a plurality of edge portions 348 each defining a curve which corresponds to an outer perimeter of a lapel pin 350. Additionally, the base portion 342 defines a plurality of slots 352 configured to receive a clip or other attachment device (not shown) of the lapel pin 350. Insertion of the clip into a slot 352 aligns the lapel pins consistently across the workpiece support to enable laser cutting or engraving of multiple workpieces during one or more passes of the laser 112 across a row of lapel pins located at each of the defined locations.

Figure 23:
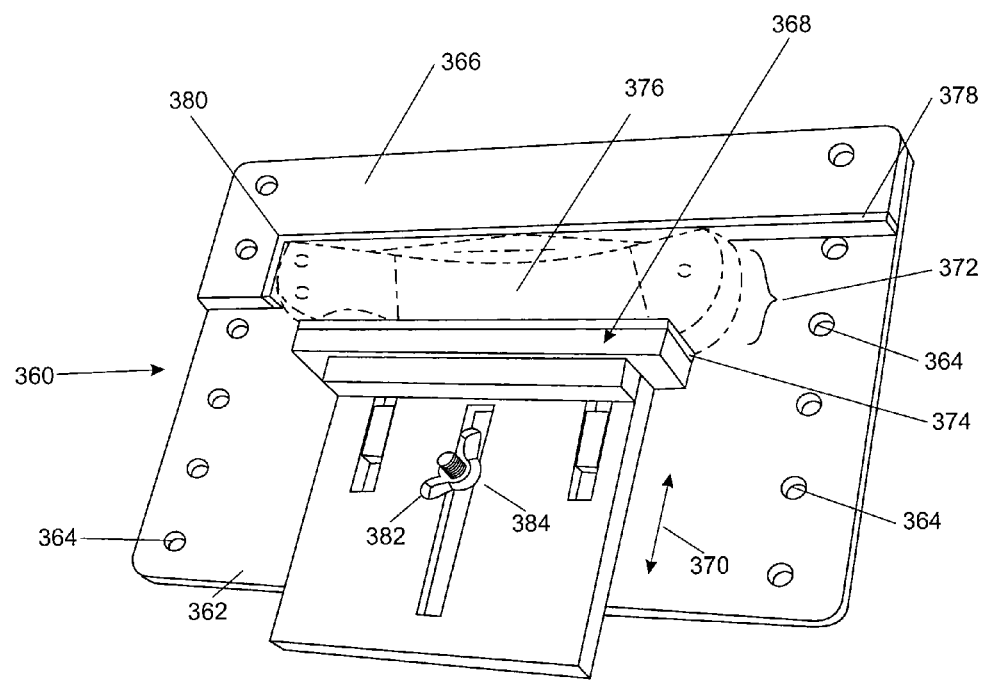
FIG. 23 illustrates a vise workpiece support.
Figure 26:
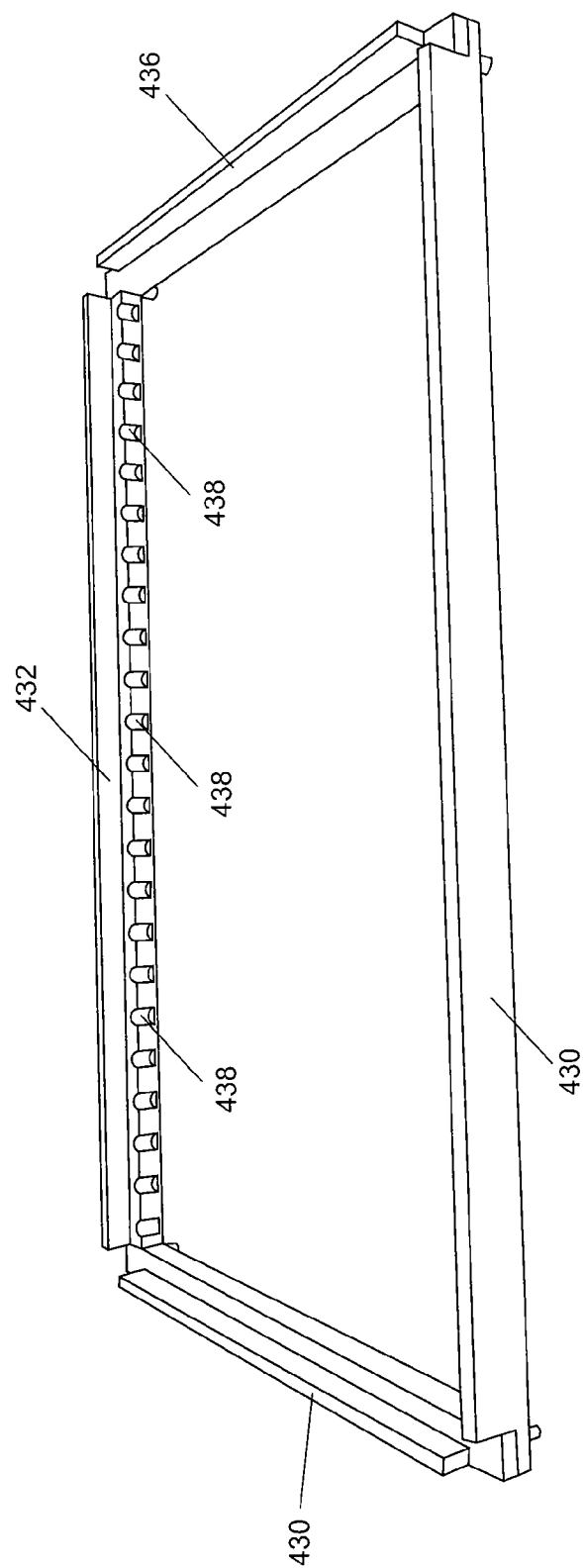
FIG. 26 illustrates a perspective view of another embodiment of a laser workpiece cutting frame configured to be supported by a laser cutting machine.

FIG. 23 illustrates a vise workpiece support 360 including a base portion 362 having a plurality of apertures 364 configured to engage pins of one or more of the pin rails 136. The support 360 includes a backstop 366 configured as a part of the base portion 362 and an adjustable jaw 368 which slidingly engages the base portion 362. The jaw 368 is displaceable along a direction 370 to provide an adjustable gap 372 between the backstop 366 and a face 374 of the jaw 368. In the illustrated embodiment, the face 374 includes a non-slip material which engages a workpiece, i.e. pocketknife 376, between the jaw 368 and a non-slip material 378 of the backstop 366. In the illustrated embodiment, the backstop 366 is L-shaped to provide adjoined surfaces at a corner 380. The corner 380 provides an indexing location such that the workpiece 376 is held relatively stationary in the support 360 on three sides of the workpiece. A wingnut 382 and a wingbolt 384 cooperate to stationarily fix the jaw 368 with respect to the base portion 362. Consequently, the support 360 is configurable to support a variety of workpieces between the backstop 366 and jaw 368.

FIG. 24 illustrates a pen engraving workpiece support 390 configured to support a plurality of pens, one of which is shown as pen 392. The support 390 includes a first pen support 394 and a second pen support 396 each of which are fixedly coupled to a base 398 having apertures 400. Each of the pen supports 394 and 396 includes a plurality of notches 402 configured to support a portion of the pen 392. In this embodiment, the notches 402 (workpiece engaging structures) include a flat 404 and angled sidewalls 406. A stop 408 is located on the base 396 and extends along the row of apertures located on the left side of the base 398 as illustrated. As can be seen, the pen 392 is moved toward and in contact with the stop 408 which locates the pen 392 at a predetermined location. In the event that more than one pen 392 is being engraved during a job run, each of the pens when moved into contact with the stop include engraved indicia which appear on each of the pens in substantially the same location. This stop 400 and other stops described herein, therefore, provide for a repeatable engraving or cutting on multiple workpieces of the same type during an engraving job.

As shown in FIG. 25, another embodiment of a pin rail is illustrated as elongated rail 410. In this embodiment, the elongated rail 410 is configured to receive pins as opposed to having pins. The rail 410 includes a length defined between a first end 412 and a second end 414. At the first end 412, the elongated rail 410 includes a first finger 416 and a second finger 418. Similarly, the elongated rail 412 includes a first finger 420 and a second finger 422 formed at the second end 414. When coupling the first end 412 to either the first side rail 122 or the second side rail 124, the first finger 416 and second finger 418 are positioned within adjacently defined locating structures 134 in the corresponding side rail. The first finger 420 and second finger 422 of the second end 414 are subsequently positioned within adjacently defined slots locating structures in the other of the rails. Of course, since each of the first side rail 122 and second side rail 124 are substantially identical, the order of placement of ends in which side rail is not critical and other orders are possible. In fact, this elongated rail as well as the other described pin rails is locatable by placing the ends in the side rails at the same time.

The elongated rail 410 includes a plurality of plurality of openings 424 configured to receive pins, as opposed to including plurality of pins extending from the previously described pin rails 136. In this embodiment, each of the openings is equally spaced and is configured to receive one or more pins located on workpiece supports (not shown). To use the elongated rail 410, the apertures of the workpiece supports are replaced with engaging pins to interface with the openings 424. In other embodiments, the openings 424 include threads or other structures configured to receive screws, bolts or other engaging structures configured to couple fixtures to the rail 410. Likewise, while pins are illustrated for the pin rails 136, each of the pins, in different embodiments of pin rails, is replaced with apertures, and each of the apertures of the workpiece supports are replaced with pins.

Figure 28:
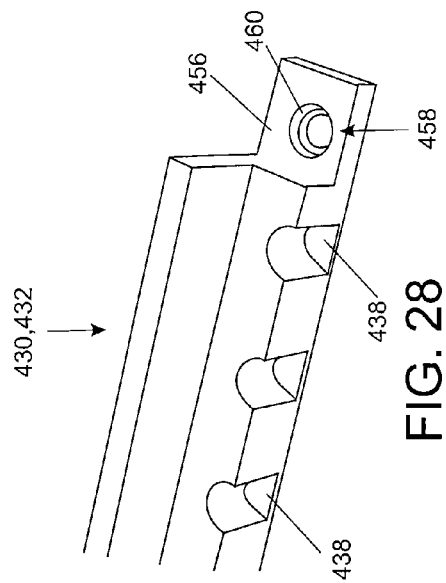
FIG. 28 illustrates an end of one another of the side rails.
Figure 27:
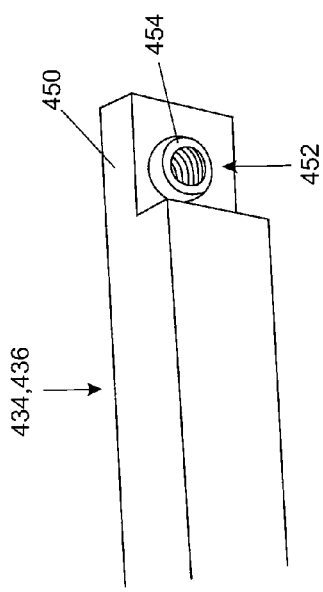
FIG. 27 illustrates an end of one of the side rails.

FIGS. 26-32 illustrate another embodiment of the system 100 including a first side rail 430, a second side rail 432, a third side rail 434 and a fourth side rail 436. The first and second side rails 430 and 432 include locating structures 438 as previously described. In this embodiment, however, the ends of each of the first, second, third, and fourth side rails 430, 432, 434, and 436 are configured to engage an adjoined end of an adjacent side rail using what is generally known as a lap joint. As illustrated in FIG. 27, an end of one of the side rails 434 and 436 includes a tongue 450 extending along the length of the side rail. The tongue 450 includes an aperture 452 having threads and a circumferential raised portion 454. FIG. 28 illustrates one end of one of the side rails 430 and 432 including a tongue 456 having an aperture 458. The aperture 458 includes a circumferential recess 460 configured to receive the raised portion 454.

Figure 29:
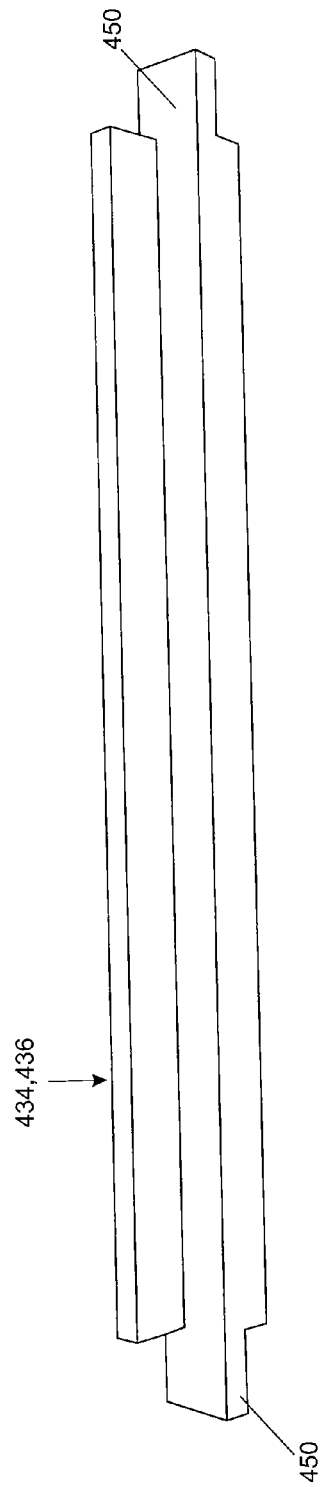
FIG. 29 illustrates a front view of one of the side rails.
Figure 31:
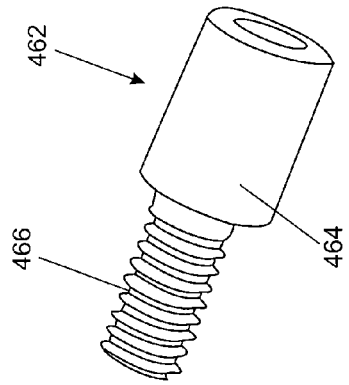
FIG. 31 illustrates a perspective view of a coupler.

FIG. 29 illustrates a front view of one of the side rails 430 and 432.

Figure 30:
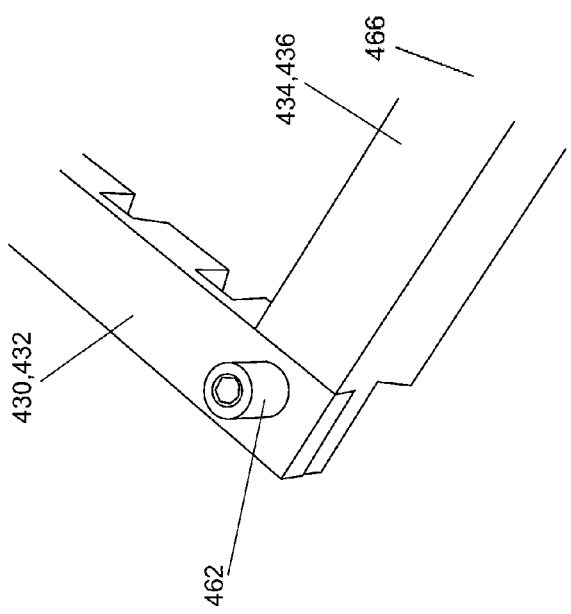
FIG. 30 illustrates a bottom perspective view of two side rails coupled together at a corner.
Figure 32:
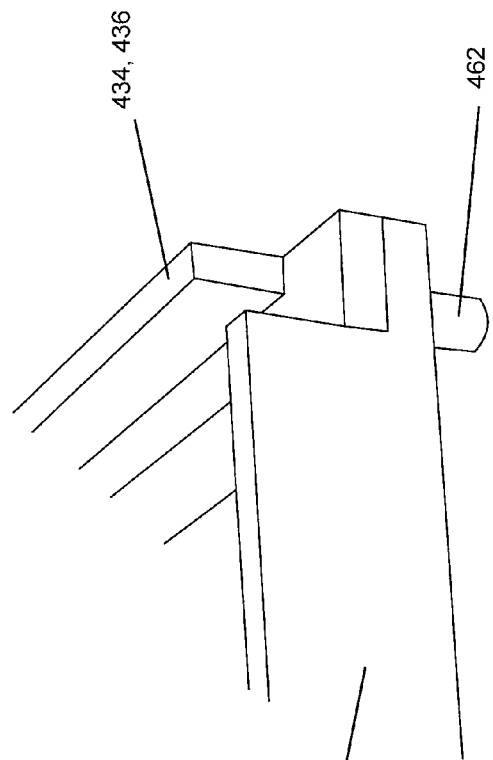
FIG. 32 illustrates a front perspective view of two side rails coupled together at a corner.

As further illustrated in FIG. 30, one of the side rails 430, 432 is coupled to one of the side rails 434, 436 such that the respective tongues 450 and 456 overlap and the raised portion 454 engages the recess 460. The two side rails are coupled together and secured by a coupler 462. The coupler 462 includes a base portion 464 and a threaded portion 466 extending from the base portion 464. The threads of the threaded portion 466 engage the threads of the aperture 452 and upon tightening, the coupler 462 holds the side rails together. In addition to coupling the side rails at the corners of the frame, the coupler 462 provides support for the corners of the frame as illustrated in FIG. 32.

As described herein, the workpiece supports, including the V-block risers or other risers describe herein, allow round, curved or odd-shaped curved work pieces to be laser cut without requiring the use of a rotary attachment. As a result, production can be increased with better quality and a reduction in setup costs.

Although the above-described embodiments and examples refer to pieces of the system 100 fitting together without being permanently engaged, the different structures are securely coupled to one another to form a robust frame and system 100 for performing a laser cutting operation. Moreover, in other examples, fasteners and other mechanisms can be used to further fasten, connect, attach, lock, secure, or otherwise support the system 100.

The system 100 is shown as a modular unit that can be easily assembled or disassembled within a short amount of time. The side rails can further align the system 100 with the laser table. In another embodiment, the corner support brackets can include a tongue-like structures formed on its bottom surface for being received within a groove or channel defined in an upper surface of the laser table. This structure provides to further support the system from any movement during a laser cutting operation.

Due to the flexibility of the system 100 and equidistantly spaced locating structures of the side rails and pins, any shaped workpiece can be accommodated on the system 100 by adjusting the number and location of the support rails. Such workpieces include glassware, writing instruments, leather products, novelty items, toys, and utensils.

Shorter production times and increased production throughput is achieved. The system 100 further enables cutting of irregularly shaped work pieces and materials to be longitudinally and transversely positioned on the laser table. Moreover, the V-block riser and the other risers and fixtures contemplated within this disclosure allow for different shaped materials and work pieces to be laser cut to maximize engraving and cutting production. These risers and fixtures can further provide self-leveling to position the work piece or material substantially perpendicular to the laser table (and laser) during a laser cutting operation to achieve maximum cutting efficiency.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A laser workpiece cutting system of configured to hold a workpiece to be cut by a laser supported by a laser table system haying a laser, the laser workpiece cutting system comprising:
   a plurality of rails, each of the plurality of rails having a longitudinal axis, and including a plurality of equally spaced pins extending from the rail, wherein each of the pins includes a cone-shaped portion extending from the rail and which are exposed as the workpiece is cut by the laser, wherein each of the rails includes a first end and second end, each first end and second end being configured to provide an abutting surface;
   a base having a first side, a second side, a third side, and a fourth side wherein each of the first side and the second side defines a plurality of pins or apertures uniformly spaced along a length of the first side and second side and each of the pins or apertures having a sidewall extending from a base surface, and each aperture being configured to locate the abutting surface of one of the plurality of rails, and each of the first side, second side, third side, and fourth side include first and second terminating ends, each of the first and second terminating ends including a mating structure and each of the first and second terminating ends being inclined with respect to a longitudinal axis of the respective side; and
   a plurality of corner brackets, each including a first support arm and a second support arm each having a connector structure and each of the first support arm and the second support arm aligned with one another to form a coextensive surface, wherein engagement of the mating structure to the connector structure aligns one of the first and second terminating ends of one of the sides with one of the first and second terminating ends of another of the sides such that the aligned ends form an interface therebetween at the coextensive surface: wherein the plurality of corner brackets when engaged to the base defines a base plane, wherein each of the cone-shaped portions terminates at a tip, and each of the plurality of pins or apertures is configured to locate each of the tips at a tip plane substantially parallel to the base plane, wherein the cone-shaped portions and the tip are configured to diffuse the laser as the workpiece is cut by the laser to substantially reduce flashback.

2. The laser workpiece cutting system of claim 1 further comprising a locator adjustably coupled to at least one of the base and one of the plurality of corner brackets, wherein the locator is configured to fix the location of the base with respect to the laser system table.

3. The laser workpiece cutting system of claim 2 wherein at least two of the plurality of corner brackets includes a leg portion extending from one of the first support arm and second support arm, the leg portion defining with one of the first support arm and second support arm a space configured to locate a connector.

4. The laser workpiece cutting system of claim 3 wherein each of three of the sides includes a first height extending from the plurality of supports and one of the sides includes a second height less than the first height to define a support surface, wherein the support surface is substantially aligned with the tip plane.

5. The laser workpiece cutting system of claim 1 further comprising a plurality of work piece supports each including plurality of spaced openings configured to operatively engage the plurality of equally spaced cones.

6. The laser workpiece cutting system of claim 5 wherein the plurality of workpiece supports includes a riser portion configured to elevate a portion of the workpiece above the tip plane.

7. The laser workpiece cutting system of claim 6 wherein the riser portion is configured to be adjustable with respect to the tip plane.

8. The laser workpiece cutting, system of claim 7 wherein the riser portion includes a receiving portion configured to receive the workpiece, wherein the receiving portion includes a high friction surface having a friction greater than a friction of an adjacent surface.

9. The laser workpiece cutting system of claim 1 wherein the uniform spacing of the plurality of pins or apertures locates adjacent pin rails in parallel upon engagement of the first and second terminating ends with the plurality of pins or apertures.

* * * * *